(12) United States Patent
Leng et al.

(10) Patent No.: US 9,079,689 B2
(45) Date of Patent: Jul. 14, 2015

(54) MULTILAYER COMPOSITE

(75) Inventors: Victor Leng, Guangdong (CN); Qiwei Lu, Seven Hills, OH (US); Joseph J. Vontorcik, Jr., Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 36 days.

(21) Appl. No.: 14/123,552

(22) PCT Filed: May 17, 2012

(86) PCT No.: PCT/US2012/038244
§ 371 (c)(1),
(2), (4) Date: Dec. 3, 2013

(87) PCT Pub. No.: WO2012/166373
PCT Pub. Date: Dec. 6, 2012

(65) Prior Publication Data
US 2014/0097187 A1   Apr. 10, 2014

Related U.S. Application Data

(60) Provisional application No. 61/493,015, filed on Jun. 3, 2011.

(51) Int. Cl.
| | | |
|---|---|---|
| B29D 22/00 | (2006.01) | |
| B29D 23/00 | (2006.01) | |
| B32B 1/08 | (2006.01) | |
| B32B 27/08 | (2006.01) | |
| B65D 30/08 | (2006.01) | |
| B32B 27/40 | (2006.01) | |
| B32B 5/14 | (2006.01) | |
| B32B 7/02 | (2006.01) | |

(52) U.S. Cl.
CPC ............... *B65D 31/02* (2013.01); *B32B 5/142* (2013.01); *B32B 7/02* (2013.01); *B32B 27/08* (2013.01); *B32B 27/40* (2013.01); *B32B 2307/206* (2013.01); *B32B 2307/536* (2013.01); *B32B 2307/584* (2013.01); *B32B 2307/7265* (2013.01); *B32B 2439/00* (2013.01); *Y10T 428/1341* (2015.01); *Y10T 428/24983* (2015.01)

(58) Field of Classification Search
CPC ........ B65D 31/02; B32B 27/40; B32B 5/142; B32B 7/02; B32B 27/08; B32B 2307/206; B32B 2307/536; B32B 2307/584; B32B 2307/7265; B32B 2439/00; Y10T 428/24983; Y10T 428/1341
USPC ............. 428/217, 35.4; 220/495.01; 383/109; 156/308.2, 244.11
See application file for complete search history.

(56) References Cited

U.S. PATENT DOCUMENTS

| | | |
|---|---|---|
| 3,409,714 A | 11/1968 | Strugar, Jr. |
| 5,047,495 A | 9/1991 | Kolycheck |

FOREIGN PATENT DOCUMENTS

| | | |
|---|---|---|
| CA | 2123053 A1 | 11/1994 |
| EP | 0624463 A2 | 11/1994 |
| WO | 2009/142949 A1 | 11/2009 |
| WO | 2011/046756 A1 | 4/2011 |

*Primary Examiner* — Michael C Miggins
(74) *Attorney, Agent, or Firm* — Thoburn T. Dunlap

(57) ABSTRACT

A flexibly multilayer composite comprising at least one barrier layer of high hardness TPU having a Shore D hardness of at least 80, a soft segment content of less than 5%, and a low gasoline vapor transmission rate of less than 1 g/M²/day. The composite also has at least one layer of soft TPU static dissipative polymer having a surface resistivity of less than $1.0 \times 10^{12}$ ohms/square a Shore durometer of form 60 A to 60 D, and a gum residue of less than 20 mg per 100 ml of gasoline after 1 week exposure. The composite may have an optional third layer of an abrasion resistant TPU. The abrasion resistant TPU layer may contain reinforcement material, such as fabric.

32 Claims, No Drawings

MULTILAYER COMPOSITE

CROSS REFERENCE TO RELATED APPLICATION

This Application claims priority from PCT Application Ser. No. PCT/US2012/038244 filed on May. 17, 2012, which claims the benefit of U.S. Provisional Application No. 61/493,015 filed on Jun. 3, 2011.

TECHNICAL FIELD

This invention relates to a multilayer composite. The multilayer composite is suitable for storing or transporting fuel, such as gasoline or diesel fuel. The multilayer composite is made from thermoplastic polyurethane.

BACKGROUND

In the practice of storing or transporting fuel for later use, fuel can be lost to evaporation or spillage. When fuel escapes from its container, it is not only an economic loss but is also an environmental issue.

Fuel is typically stored and transported in rigid tanks, such as metal or rigid composite tanks. The metal tanks can corrode and leak liquid fuel or fuel vapors. Composite tanks can crack or delaminate and leak liquid fuel or fuel vapors. Moreover, rigid storage tanks are not collapsible and storable when not in use.

Thermoplastic polyurethanes (TPU) are known to be very abrasion resistant and easily processed by extrusion or calendering into sheet or film forms. Typical TPU polymers are not normally suitable for storing large amounts of fuel because they are not resistant to the passage of fuel vapors. Also, thermoplastic polymers tend to build up static electrical charges when fuel moves around in contact with the thermoplastic. The movement of the fuel occurs when the storage device is filled or emptied with fuel. A static charge around fuel can be very hazardous. A small discharge of static electricity can cause an explosion and fire to occur.

Patent Application WO 2010/017744A1 describes a membrane which can be inserted in a normal rigid fuel storage tank. The membrane has a layer of anti-static material on the inside (next to the fuel), a gas barrier layer and an outer layer that is resistant to wear and tear.

There is a need for a fuel storage membrane which will dissipate static electrical charges, is resistant to dissolving in the fuel, is resistant to the passage of fuel vapors and is easily storable when not in use.

SUMMARY

It is an objective of this invention to provide a flexible multilayer composite which is suitable for storing and transporting fuel.

It is also another object that the composite is resistant to the buildup of static electricity. It is a further objective that the composite provides a barrier to the transmission of fuel vapors through the composite. A still further objective is that the composite be simple to assemble and be capable of heat or ultrasonic welding or be capable of joining together by adhesive.

Another objective of the present invention is to provide a flexible and collapsible fuel storage bag that is foldable for easy storage and transport when not in use.

These and other objectives are accomplished by using a thermoplastic polyurethane (TPU) for the various layers of the composite.

In one embodiment, the composite has at least one barrier layer of a high hardness TPU having a Shore D durometer of at least 80, preferably at least 81, more preferably at least 82, still more preferably at least 83, still more preferably at least 84, and most preferably about 85, as measured according to ASTM D-2240. The barrier layer has a soft segment content of less than about 5 weight percent and preferably 0 weight percent soft segment. The barrier layer also has a low gasoline vapor transmission rate of less than about 1 gram/meter$^2$/day preferably less than 0.5, and more preferably less than 0.1 as measured on a 0.5 mm thick film according to ASTM D-814. In this embodiment the composite also has at least one layer of soft static dissipative TPU. The static dissipative TPU layer has a surface resistivity of less than about $1.0 \times 10^{12}$ ohms/square, preferably from about $1.0 \times 10^6$ to about $1.0 \times 10^{10}$, as measured according to ASTM D-257. The static dissipative layer also has a Shore durometer of from about 60 A to about 60 D, preferably from about 85 A to about 95 A, as measured according to ASTM D-2240. The static dissipative layer is also resistant to forming a gum residue when exposed to gasoline, as evidenced by a gum residue of less than about 20 milligrams, preferably less than 10, and more preferably less than about 5 milligrams per 100 milliliters of gasoline after one week exposure to gasoline, as measured according to ASTM D-381.

Optionally, the composite may contain at least a third TPU layer in addition to the above described two layers. The optional third layer is an abrasion resistant TPU layer. The optional third layer may contain a reinforcement, such as a fabric.

In another embodiment, the TPU layers are melt processed such that they are melt bonded together. The melt processing can be by coextrusion or calendering the TPU layers.

In a preferred embodiment, the static dissipative layer is configured to be the inner layer, such that it is in contact with fuel when in use. It is also preferred that the inner layer contain an ionic additive to enhance its static dissipative properties.

In an embodiment, the composite is formed into a membrane or bag for insertion into a rigid frame or container to contain the fuel. The membrane can be formed by using the composite in sheet form and heat welding, sonic welding, or adhesively connecting multiple composite sheets together to form the membrane.

In the most preferred embodiment, the TPU barrier layer is about 85 Shore D durometer and is essentially free of soft segment (polyol) but is made from the reaction of an aromatic diisocyanate and a short chain diol chain extender.

In another embodiment, the thickness of the inner static dissipative layer is from about 0.005 to about 3.0 mm, preferably from 0.01 to 1.5 mm, and more preferably from 0.03 to 0.1 mm, the thickness of the barrier layer is from about 0.005 to about 0.3 mm, preferably from 0.01 to 0.15 mm, and more preferably from 0.02 to 0.1 mm, and the thickness of the outer layer of abrasion resistant TPU is from about 0.005 to about 3.0 mm, preferably from 0.1 to 2.0 mm, and more preferably from 0.3 to 0.5 mm. For options where the outer layer contains reinforcement, the thickness is about 0.5 to about 3.0 mm, preferably 0.8 to 2.0 mm.

DETAILED DESCRIPTION

The multilayer composites of this invention are made from thermoplastic polyurethane (TPU for short). TPU polymers are normally made by reacting three ingredients, a hydroxyl terminated intermediate which is also known as a polyol. The hydroxyl terminated intermediate is normally a polyether, polyester, poly(ether-ester), or polycarbonate. The second ingredient in the reaction to form a TPU polymer is a polyisocyanate, typically a diisocyanate. The third ingredient is a short chain glycol, commonly referred to as a chain extender.

A less well known TPU is a very rigid TPU which is made by the reaction of a polyisocyanate and a short chain glycol chain extender, with no polyol or a very small amount of polyol. This type of TPU has a high amount of hard segment, usually 100%. The hard segment content of a TPU is based on the weight percent of the polyisocyanate plus the chain extender. The soft segment is defined as the weight percent of the polyol in the TPU.

The multilayer composites of this invention have an inner layer of static dissipative TPU.

Static Dissipative Layer

The static dissipative layer is made by reacting at least one low molecular weight polyoxirane or poly(diakylene glycol ester) hydroxyl terminated intermediate with a polyisocyanate and a short chain glycol chain extender.

The low molecular weight polyoxirane may be a polyether oligomer that includes a homopolymer or copolymer of polyethylene glycol (PEG), polypropylene glycol (PPG), or a combination thereof. The low molecular weight polyoxirane hydroxyl terminated intermediates are polyether polyols derived from a diol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran (PTMEG). Poly(ethylene glycol) (PEG), poly (propylene glycol) PPG, and ethylene oxide-propylene oxide are the preferred polyether intermediate. Polyether polyols further include polyamide adducts of an alkylene oxide and can include, for example, ethylenediamine adduct comprising the reaction product of ethylenediamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and Poly THFR, a random copolymer. The various polyether intermediates generally have a number average molecular weight (Mn) as determined by assay of the terminal functional groups which is a number average molecular weight of from about 500 to about 5,000 Daltons, desirably from about 650 to about 3,000, and preferably from about 1,000 to about 2,000. A particular desirable polyether hydroxyl terminated intermediate is a poly(ethylene glycol) having an Mn of about 1,000 Daltons. A blend of two or more polyether intermediates can be used in the static dissipative layer of the composite of this invention.

The hydroxyl terminated intermediate used in the TPU of this invention should be difunctional with hydroxyl groups on each end of the chain. Trifunctional and greater polyols tend to give thermoset polyurethanes and should be avoided. Of course, a small amount, such as 1.0 weight percent or less of the total TPU weight, of trifunctional or greater functional polyols can be used, as long as the amount is small enough to not result in a thermoset polyurethane.

Another type of hydroxyl terminated intermediate that can be used to make the static dissipative layer of the composite of this invention is a poly(diakylene glycol ester). Poly(diakylene glycol ester) intermediates are made by reacting a dicarboxylic acid with a diakylene glycol. Suitable dicarboxylic acids which may be used alone or in mixtures generally have from 4 to 15 carbon atoms and include: succinic, glutaric, adipic, pimelic, suberic, azelaic, sebacic, dodecanedionic, isophthalic, terephthalic, cyclohexane dicarboxylic, and the like Anhydrides of the above dicarboxylic acids, such as phthalic anhydride, tetrahydrophthalic anhydride, or the like can also be used. Adipic acid is the preferred acid. Suitable polyalkylene glycols include polyethylene glycol, polypropylene glycol, polyethyleneglycol-polypropylene glycol copolymers, and combinations thereof. Suitable poly (diakylene glycol ester)polyol intermediates may be derived from at least one dialkylene glycol and at least one dicarboxylic acid, or an ester or anhydride thereof. The polyol intermediate may also be a mixture of two or more different types of polyols. In some embodiments, the polyol intermediate includes a polyester polyol and a polyether polyol. The preferred dialkylene glycol to react with the dicarboxylic acid is diethylene glycol. The reaction of adipic acid and diethylene glycol results in the poly(diakylene glycol ester)polyol known as poly(diethylene adipate)glycol.

The number average molecular weight of the poly(diakylene glycol ester)polyol is similar to that described above for the polyether polyols. A blend of two or more polyols may be used in making the TPU which is used in the static dissipative layer of the composite.

The second necessary reactant to make the static dissipative TPU is a polyisocyanate. The polyisocyanates generally have the formula $R(NCO)_n$, where n is generally from 2 to 4, with 2 being highly preferred inasmuch as the TPU is a thermoplastic. Thus polyisocyanates having a functionality of 3 or 4 are utilized in very small amounts, for example, less than 5% and desirably less than 2% by weight based on the weight of all polyisocyanates, inasmuch as they cause crosslinking. The preferred polyisocyanate is a diisocyanate. R can be aromatic, cycloaliphatic, aliphatic, or mixtures thereof generally having a total of from 2 to about 20 carbon atoms. Examples of suitable aromatic diisocyanates include diphenyl methane-4-4'-diisocyanate (MDI), $H_{12}$MDI, m-xylylene diisocyanate (XDI), m-tetramethyl xylylene diisocyanate (TMXDI), phenylene-1,4-diisocyanate (PPDI), 1,5-naphthalene diisocyanate (NDI), and diphenylmethane-3,3'-dimethoxy-4,4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanate-2,2,4,4-tetramethyl hexane (TMDI), 1,10-decane diisocyanate, and trans-dicyclohexylmethane diisocyanate (HMDI). A highly preferred diisocyanate is MDI.

The third necessary reactant to make the static dissipative TPU is the chain extender. Suitable chain extenders are lower aliphatic or short chain glycols having from 2 to about 10 carbon atoms. These include, for example, ethylene glycol, diethylene glycol, propylene glycol, dipropylene glycol, tripropylene glycol, thiethylene glycol, cis-trans isomers of cyclohexyl dimethylol, neopentyl glycol, 1,4-butanediol, 1,6-hexanediol, 1,3-butanediol, and 1,5-pentanediol. Aromatic glycols can also be used as the chain extender but are not the preferred chain extender. Examples of aromatic chain extenders include benzene glycol (HQEE) and xylene glycols. Xylene glycol is a mixture of 1,4-di(hydroxymethyl)benzene and 1,2-di(hydroxymethyl)benzene. Benzene glycol specifically includes hydroquinone, i.e., bis(beta-hydroxyethyl) ether also known as 1,4-di(2-hydroxyethoxy)benzene; resorcinol, i.e., bis(beta-hydroxyethyl)ether also known as 1,3-di(2-hydroxyethyl)benzene; catechol, i.e., bis(beta-hydroxyethyl)ether also known as 1,2-di(2-hydroxyethoxy) benzene, and combinations thereof. The preferred chain extender to make the static dissipative layer is 1,4-butanediol.

The TPU polymer used in the static dissipative layer can also contain an ionic additive to enhance its static dissipative properties. Suitable examples of the ionic additive includes a metal containing salt, an ionic liquid, or a combination thereof. The metal containing salt is preferably an alkali metal salt, more preferably lithium or sodium containing salt. Suitable ionic liquids include ammonia salts and tertiary amine compounds that do not contain metal. Any salt or ionic liquid can be used for the ionic additive which does not migrate out of the TPU and which increases the conductivity of the TPU. The preferred ionic additive to use is a lithium salt. Examples of suitable lithium salts include: $LiClO_4$, $LiN(CF_3SO_2)_2$, $LiPF_6$, $LiAsF_6$, $LiI$, $LiBr$, $LiSCN$, $LiSO_3CF_3$, $LiNO_3$, $LiC(SO_2CF_3)_3$, $Li_2S$, $LiBO$, and $LiMR_4$ where M is Al or B, and R is a halogen, alkyl or aryl group. The preferred salt is $LiSO_3CF_3$, which is commonly referred to as lithium trifluoromethane sulfonate. The ionic additive is used at a level of from about 0.05 to about 5 weight percent of the TPU, preferably from 0.1 to 2.5, and more preferably from 1.0 to 2.0. Normal antistatic additives for thermoplastics which rely on the additive migrating to the surface to achieve antistatic properties are not acceptable. These types of additives will migrate out of the TPU and into the fuel and will not have permanent antistatic properties. The preferred ionic additives listed above are permanent.

The above three necessary ingredients (hydroxyl terminated intermediate, polyisocyanate, and chain extender) are preferably reacted in the presence of a catalyst.

Generally, any conventional catalyst can be utilized to react the diisocyanate with the polyether intermediate or the chain extender and the same is well known to the art and to the literature. Examples of suitable catalysts include the various alkyl ethers or alkyl thiol ethers of bismuth or tin wherein the alkyl portion has from 1 to 20 carbon atoms with specific examples including bismuth octoate, bismuth laurate, and the like. Preferred catalysts include the various tin catalysts such as stannous octoate, dibutyltin dioctoate, dibutyltin dilaurate, and the like.

The amount of such catalyst is generally small such as from about 20 to about 200 parts per million based on the total weight of the polyurethane forming monomers.

The TPU polymer for the static dissipative layer can be made by any of the conventional polymerization methods well known in the art and literature.

The TPU polymer is preferably made via a "one shot" process wherein all of the components, including reactants are added together simultaneously or substantially simultaneously to a heated extruder and reacted to form the TPU polymer. The reaction temperature utilizing urethane catalyst are generally from about 175° C. to about 245° C., and preferably from about 180° C. to about 220° C. The equivalent ratio of the diisocyanate to the total equivalents of the hydroxyl terminated intermediate and the diol chain extender is generally from about 0.95 to about 1.05, desirably from about 0.97 to about 1.03, and preferably from about 0.98 to about 1.01.

The shore hardness of the TPU static dissipative layer is from about 60 A to about 60 D, preferably from about 80 A to about 98 A, and more preferably from about 88 A to about 95 A. The weight average molecular weight (Mw) of the TPU is from about 50,000 to about 300,000 Daltons, preferably from about 70,000 to about 200,000, and more preferably from about 90,000 to about 150,000.

The TPU polymer used in the static dissipative layer can also be prepared utilizing a pre-polymer process. In the pre-polymer process, the hydroxyl terminated intermediate is first reacted with an excess equivalent of one or more polyisocyanate to form a pre-polymer having free or unreacted polyisocyanate. Subsequently, a chain extender is added and reacted with the pre-polymer to form a TPU. Typically, the pre-polymer process can be conducted in any conventional device, with an extruder being preferred. Thus, the hydroxyl terminated intermediate is reacted with an equivalent excess of a diisocyanate in a first portion of the extruder to form the pre-polymer and the chain extender is added at a downstream portion of the extruder and reacted with the pre-polymer to create a TPU.

Useful additives to the TPU can be used in suitable amounts, typically less than 5.0 weight percent of the TPU polymer weight. Suitable additives include opacifying agents, colorants, mineral fillers, antioxidants, stabilizers, lubricants, UV absorbers, processing aids, and other additives as desired.

The TPU used for the static dissipative layer will have a surface resistivity of less than about $1.0 \times 10^{12}$ ohms/square, preferably from about $1.0 \times 10^6$ to about $1.0 \times 10^{10}$ ohms/square, as measured according to ASTM D-257.

Another important property that the static dissipative TPU for the inner layer must have is resistance to fuel, such as gasoline. This is determined by a gum residue test according to ASTM D-381. The gum residue test is performed by pre-drying a sample of the TPU to be tested in a dehumidifier for 3 hours at 80° C. The dried sample is then injection molded into 2 mm thick plaques. The molded plaques are then put in an air conditioner at 23° C. and 50% relative humidity for 24 hours. The plaques are cut into pieces measuring 20 mm long, 3 mm wide and 2 mm thick.

Fuel B is prepared by mixing 30% by weight toluene with 70% by weight iso-octane. An empty glass cup is weighed. The cut pieces of TPU are added to the cup and 250 ml of fuel is added to the cup. The contents of the cup (fuel+TPU) is conditioned at 38° C. for 7 days. The undissolved TPU pieces are removed from the cup and the fuel in the cup is evaporated. The cup is then weighed with the gum residue in the cup. The first weight of the empty cup is subtracted from the weight of the cup containing the gum residue to determine the weight of the gum residue. The gum residue content is calculated as mg/100 ml of fuel.

The static dissipative TPU should have a gum content of less than about 20 mg/100 ml of gasoline, preferably less than about 10 mg/100 ml of gasoline, and more preferably less than about 5 mg/100 ml of gasoline.

The thickness of the static dissipative layer is from about 0.005 to about 3.0 mm, preferably from 0.01 to 1.5 mm, and more preferably from 0.03 to 0.1 mm.

Barrier Layer

At least one barrier layer (second layer) which is resistant to the transmission of fuel vapors is used in the composite. If a third layer of abrasion resistant TPU is used, the barrier layer is placed between the static dissipative layer and the abrasion resistant layer. The barrier layer has a thickness of from about 0.005 to about 0.3 mm, preferably from 0.01 to 0.15 mm, and more preferably 0.02 to 0.1 mm. If the barrier layer is too thick, the composite will not be flexible.

The barrier layer is a high hardness TPU, with a Shore D hardness of about 80, 81, 82, 83 or greater, preferably about 83.5 and more preferably about 85, as measured according to ASTM D-2240. The barrier layer will be described more fully below for the preferred material of a high hardness TPU.

The high hardness TPU polymer is made by reacting a polyisocyanate with a short chain diol (i.e., chain extender), and optionally less than about 5, 4, 3, 2, or 1 weight percent of polyol (hydroxyl terminated intermediate). Preferably, the high hardness TPU barrier is substantially free of any polyol. Thus, the barrier layer TPU has at least 95%, 96%, 97%, 98% or 99% weight hard segment, and preferably 100% hard segment.

Suitable chain extenders to make the high hardness TPU polymer barrier layer are preferably lower aliphatic or short chain glycols having from 2 to about 12 carbon atoms and include, for instance, ethylene glycol, diethylene glycol, propylene glycol, dipropylene glycol, 1,4-butanediol, 1,6-hexanediol, 1,3-butanediol, 1,5-pentanediol, neopentylglycol, and the like, as well as mixtures thereof. The preferred chain extenders are 1,4-butanediol and 1,6-hexanediol. Other glycols, such as aromatic glycols could be used, but are not preferred.

Suitable polyisocyanates to make the rigid very hard TPU polymer barrier layer includes aromatic diisocyanates such as 4,4'-methylenebis-(phenyl isocyanate) (MDI), m-xylene diisocyanate (XDI), pheynlene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. Mixtures of two or more polyisocyanates may be used. The most preferred polyisocyanate is 4,4'-methylenebis (phenyl isocyanate), i.e., MDI.

Preferably, the high hardness TPU polymer used as the barrier layer is made by reacting the polyisocyanate shown above with the chain extender, without any polyol being present. If polyols are used, they should be used in small amounts of less than about 5 weight percent of the total TPU weight. If used, the polyols, also known as hydroxyl terminated intermediates, are used in very small amounts as stated above to increase processability and impact strength. The polyols which can be used are any of the normal polyols used in making TPU polymers. These include hydroxyl terminated polyesters, hydroxyl terminated polyethers, hydroxyl terminated poly(ester-ether), and hydroxyl terminated polycarbonates.

The level of polyisocyanate, preferably diisocyanate, used is the equivalent weight of diisocyanate to the equivalent weight of hydroxyl containing components (i.e., hydroxyl terminated intermediate, if used, and the chain extender glycol). The ratio of equivalent weight of polyisocyanate to hydroxyl containing components is from about 0.95 to about 1.10, preferably from about 0.96 to about 1.02, and more preferably from about 0.97 to about 1.005.

The reactants to make the high hardness TPU polymer are reacted together in preferably a one-shot polymerization process, as described above for the static dissipative layer. Various additives can be added to the TPU as is known in the art, such as stabilizers and process aids.

Suitable high hardness TPU polymers for the barrier layer are available commercially as Isoplast® and HS 85, both available from Lubrizol Advanced Materials, Inc. of Cleveland, Ohio, U.S.A.

The barrier layer has a low gasoline vapor transmission rate of less than about 1 gram/meter$^2$/day, preferably less than 0.5, and more preferably less than 0.1, as measured on a 0.5 mm thick film according to ASTM D-814.

Optional Abrasion Resistant Layer

The composites of this invention may contain at least a third layer of abrasion resistant TPU polymer. The TPU polymer used in the abrasion resistant layer can be any type of TPU polymer that is abrasion resistant. These include the normal polyether, polyester, poly(ester-ether), and polycarbonate TPU. The abrasion resistant TPU layer is made by reacting a polyol, diisocyanate and chain extender together. Preferably, the abrasion resistant TPU is a polyether TPU made from PTMEG polyol, 1-4 butanediol chain extender and MDI. The preferred abrasion resistant TPU has a Shore A durometer of from about 80 to about 98, and more preferably from about 85 to about 95, as measured according to ASTM D-2240. Various additives, known in the art can be added to the TPU polymer, such as stabilizers and process aids.

The thickness of the abrasion resistant TPU layer is from about 0.005 to about 3.0 mm, preferably from 0.1 to 2.0 mm, and more preferably from 0.3 to 0.5 mm. There are several advantages to using the optional third layer of abrasion resistant TPU, other than abrasion resistance.

The abrasion resistant TPU layer aids in the assembly of a large fuel bag by being easier to heat or RF weld multiple sheets of composite together. Thus it is preferred to use the optional third layer.

The optional abrasion resistant TPU layer may contain a reinforcing material. Suitable reinforcing materials include any type of fabric. The fabric may contain synthetic fibers, such as polyamide (nylon), polyester, rayon, aromatic polyamide (Kevlar), or mixtures thereof. Also, the fabric may contain natural fibers, such as cotton. Carbon fibers and glass fibers may also be used in the reinforcement fabric. The preferred fiber for use in the reinforcement fabric is polyamide and aromatic polyamide fibers. The fabric may be woven or nonwoven fabric, with woven being preferred as it is stronger for a given thickness than nonwoven fabric. A particularly desirable fabric is a square woven fabric made from polyamide or aromatic polyamide. When reinforcement fabric is used in the abrasion resistant layer, the abrasion resistant TPU layer will have a thickness of from about 0.5 to about 3.0 mm, preferably from 0.8 to 2.0 mm.

Process to Make the Composite

The preferred process to make the composites of this invention is a melt process such as co-extrusion or calendering. By using a melt process, the layers are melt bonded together to create a wide sheet of composite. The sheet of composite is usually from about 3 to about 9 meters wide. The sheet can be narrower or wider depending on the need for a particular application.

Co-extrusion is the preferred method to produce the composite of this invention.

The TPU polymers used in the composite layers are normally supplied in pellet form. The pellets are added to a co-extrusion machine, melted and forced through a co-extrusion die to form sheets of the multiple layers. The layers are melt bonded together by the melt process. For the sake of brevity, specifics of the co-extrusion or calendering processes will not be discussed in this specification, as they are well known in the thermoplastic polymer field.

The composite sheet will normally have a total thickness (all layers) of from about 0.03 to about 6.3 mm, with a preferred thickness of from about 0.04 to about 4.0 mm.

To form a fuel containment bag from the composite sheets, the flexible sheet can be formed around the circumference of the desired internal opening where fuel will be stored. The ends of the sheet can be butt spliced or overlapped and securely attached together by high frequency welding, heat welding, or by adhesive. Additional sheets can be added adjacent to the first sheet and overlapped or butt spliced to the first sheet and securely attached by high frequency welding, heat welding or adhesive. Additional sheets can be added in the same way to create the desired size of the fuel container. If the sheets are overlapped, the overlap width will typically be from about 1 to 10 cm. If an adhesive is used to attach adjacent sheets, the adhesive can be formed by applying solvent to the overlap area. The solvent will dissolve the surface of the TPU and create an adhesive. The bag is normally placed inside a rigid structural support, such as metal or rigid composite. The bag will have inlet and outlet ports formed for filling and removing fuel from the bag. Also, a ground wire can be attached to remove any electrical charge. As fuel is removed from the bag, the bag can collapse onto the remaining fuel, thus reducing the vapor space.

To produce the composite sheet with fabric reinforcement in the third (outer) layer of abrasion resistant TPU, the abrasion resistant TPU can be melt coated on both sides of the fabric by using extrusion or calendering. The coated fabric can then be combined with the other two layers of TPU (static dissipative and barrier layers) as they exit from the co-extrusion dies. By combining all three layers when they are hot, they will melt bond together to form the composite sheet. When using fabric reinforcement in the abrasion resistant TPU layer, the thickness of the abrasion resistant layer will be from about 0.5 to about 3.0 mm, preferably from 0.8 to 2.0 mm. The reinforcement material can also be added to the barrier layer for embodiments which do not have the third optional layer of abrasion resistant TPU.

To form a fuel containment bag from the composite sheet where the outer layer of abrasion resistant TPU contains fabric reinforcement, the same process is used as described above for the composite sheets that did not contain reinforcement.

The containment bags, with or without reinforcement, are collapsible making them easy to ship and store when not in use.

The containment bags having fabric reinforcement can be used without being placed inside a rigid structural support. The containment bags with fabric reinforcement are intended for uses such as mining operations, military operations or construction projects, where there are temporary needs for fuel or are in remote areas without a fuel supply infrastructure. The containment bags without reinforcement are designed for use with a rigid structural support in a more permanent location, such as normal fuel dispensing service stations.

The containment bags are useful for containing or transporting fuels such as gasoline, gasohol (gasoline mixed with up to 85 weight % ethanol), diesel, and fuel oil.

The following examples are presented to more fully explain the invention.

EXAMPLE 1

This Example is presented to show the TPU static dissipative layer and its properties.

A static dissipative TPU polymer was made by reacting:
41.0 weight percent MDI;
10.5 weight percent 1,4-butanediol;
47.41 weight percent of polyglycol E-1000, a 1000 $M_n$ polyethyleneglycol polyol;
0.58 weight percent of stabilizer;
0.51 weight percent of process aid;
1.50 weight percent of Lithium salt, based on total weight of TPU without salt.

The reaction occurred in a twin screw reaction extruder by feeding all the ingredients to the extruder and collecting the polymer in pellet form at the end of palletizing line. The TPU had a surface resistivity of $1 \times 10^8$ ohms/square, as measured according to ASTM D-257. The TPU had a Shore A durometer of 90, as measured according to ASTM D-2240. The TPU had a gum residue of 1.82 mg/100 ml of Fuel B (30% toluene, 70% iso-octane), as measured according to the gum residue test described above. The TPU polymer has more than 30 Mpa tensile strength and more than 80% tensile retention after 6 weeks immersion in No. 97 gasoline.

EXAMPLE 2

This Example is presented to show the TPU barrier layer and its properties.

A barrier layer TPU was made by reacting:
66.9 weight percent MDI;
31.6 weight percent 1,6-hexanediol;
0.75 weight percent of stabilizer;
0.75 weight percent of antioxidant.

The reaction was conducted in an extruder and the TPU product was collected in pellet form. The TPU had a Shore D durometer of 85.

The TPU was made into a sheet having a thickness of 0.16 mm and tested for gasoline vapor transmission rate, according to ASTM D-814. The gasoline vapor transmission rate was 0.33 g/M$^2$/day.

EXAMPLE 3

This Example is presented to show the resistance of the high hardness TPU of Example 2 to gasoline vapor transmission at lower thickness of the TPU sheet.

The TPU polymer of Example 2 was formed into a 0.05 mm film by flat die film extrusion. Four small fuel bags were made with the 0.05 mm film by heat sealing. The 4 fuel bags were filled with No. 93 gasoline. The small fuel bags had an average exposure area to the gasoline of 0.011635 M$^2$. The gasoline filled bags were placed in a conditional chamber for 2 hours and then weighed to determine the original weight (bag plus gasoline). The gasoline filled bags were then maintained in a conditional chamber at 23° C. and 50% relative humidity for a total of 116 hours. After the 116 hour test, the gasoline filled bags were weighed to determine the loss of gasoline through vapor transmission. The gasoline vapor transmission rate was calculated. The average value for the 4 bags was 0.073 g/M$^2$/day. The results show that even a layer of the barrier TPU at 0.05 mm thick gives much less than 1 g/M$^2$/day of vapor transmission rate.

EXAMPLE 4

This Example is presented to show a 3 layer composite sheet made into a fuel bag and its resistance to vapor transmission for gasoline, gasohol (10% ethanol, 90% gasoline), and water.

The composite sheet was made by co-extrusion and had 3 layers as shown below.

Inner layer—static dissipative TPU of Example 1 having a thickness of 0.1 mm;
Barrier layer (middle layer)—the barrier TPU of Example 2 having a thickness of 0.05 mm;
Outer layer—abrasion resistant TPU made from a PTMEG polyether polyol, MDI and 1,4-butanediol and having a Shore A durometer of 88; the outer layer had a thickness of 0.1 mm.

The TPUs in pellet form were all dried separately to a moisture content of less than 200 weight parts water per million weight parts TPU. The three TPUs were fed to a co-extrusion process and the 3-layer composite was formed. The layers were melt bonded together by the co-extrusion process.

The composite sheet was formed into 3 fuel bags by heat sealing. One bag was filled with No. 93 gasoline. The second bag was filled with gasohol (10% ethanol, 90% No. 93 gasoline). The third bag was filled with water.

The test was run as in Example 3 and the vapor transmission rate was calculated after each day for 5 days.

After 5 days, the results show that the bag filled with No. 93 gasoline had a vapor transmission rate of 0.06 g/M$^2$/day. The bag filled with gasohol had a vapor transmission rate of 2.87 g/M$^2$/day. The bag filled with water had a vapor transmission rate of 7.69 g/M$^2$/day.

It is shown that water vapor transmits faster than gasoline vapor or gasohol vapor. This is believed to be because TPUs are hydrophilic and tend to transmit water vapor very easily. The transmission of gasohol vapors were greater than gasoline vapors. This is believed to be caused by the ethanol in gasohol having a strong tendency to absorb any water present. As such, the ethanol would tend to vaporize faster through the TPU composite.

EXAMPLE 5

This Example is presented to show the criticality of Shore D hardness for the barrier layer TPU. Three different TPU polymers were evaluated having Shore D hardness of 45, 70 and 85.

The test was conducted by making 3 bags from each TPU. The first 3 bags were made by first extruding a film of 0.102 mm thickness from the 45 Shore D TPU. Bags were made by heat bonding the TPU into a bag. The bags were filled with gasoline. The bags had an internal exposure area of from 0.008662 to 0.01122 M$^2$. After exposure for 0.5 hour, the bags were weighed to determine the loss of fuel through vapor transmission and average vapor transmission rate calculated for the 3 bags. The same experiment was repeated with a 70 Shore D TPU, and an 85 Shore D TPU. The results, which are an average of three tests for each TPU hardness, is shown below.

TABLE 1

| Film Thickness (mm) | Shore D Hardness | Vapor Transmission Rate (g/M$^2$/day) |
| --- | --- | --- |
| 0.102 | 45 | 24.8 |
| 0.100 | 70 | 9.3 |
| 0.050 | 85 | 0.073 |

A graph of the results shown in Table 1 where fuel vapor transmission rate (g/M$^2$/day) is the Y axis and Shore D hardness is the X axis, shows a straight line correlation with an $R^2$=1.0000. The graph shows that if a vapor transmission rate of no greater than 1 g/M$^2$/day was desired, then the TPU should be at least 83.5 Shore D hardness, if the only barrier was the barrier layer. Of course, in the multilayer composite, the other 2 layers (static dissipative layer and abrasion resistant layer will contribute a small amount to the barrier properties, as they are both much lower in shore hardness than the barrier layer).

In the foregoing description, certain terms have been used for brevity, clarity and understanding. However, no unnecessary limitations are to be implied therefrom, because such terms are used for descriptive purposes and are not intended to be broadly construed. Moreover, the descriptions herein are by way of examples, and the invention is not limited to the details shown and described.

Having described the features, discoveries and principles of the invention, the manner in which it is made, and the advantages and useful results attained, the new and useful invention are set forth in the appended claims.

The invention claimed is:
1. A flexible multilayer composite comprising:
 a) at least one layer of high hardness thermoplastic polyurethane, wherein said high hardness thermoplastic polyurethane has the following properties:
  i. a Shore D durometer of at least about 80, as measured according to ASTM D-2240;
  ii. a soft segment content of less than about 5 weight percent; and
  iii. a low gasoline vapor transmission rate of less than about 1 gram/meter$^2$/day as measured according to ASTM D-814;
 b) at least one layer of soft static dissipative thermoplastic polyurethane, wherein said soft static dissipative thermoplastic polyurethane has the following properties:
  i. a surface resistivity of less than about 1.0×10$^{12}$ ohms/square, as measured according to ASTM D-257;
  ii. a Shore durometer of from about 60 A to about 60 D, as measured according to ASTM D-2240;
  iii. a gum residue after one week exposure in gasoline of less than about 20 milligrams per 100 milliliters of gasoline, as measured according to ASTM D-381; and
 c) optionally, at least one layer of abrasion resistant thermoplastic polyurethane.

2. The flexible multilayer composite of claim 1, wherein the at least one layer of high hardness thermoplastic polyurethane in (a) has a Shore D durometer of about 85, and a soft segment content of less than about 2 weight percent.

3. The flexible multilayer composite of claim 2, wherein said high hardness thermoplastic polyurethane is the reaction product of (i) at least one diisocyanate, and (ii) at least one short chain diol.

4. The flexible multilayer composite of claim 3, wherein said short chain diol is an aliphatic diol having from about 2 to about 10 carbon atoms.

5. The flexible multilayer composite of claim 4, wherein said short chain diol is selected from the group consisting of 1,4-butanediol, and 1,6-hexanediol; and said diisocyanate is 4,4'-methylenebis-(phenyl isocyanate) (MDI).

6. The flexible multilayer composite of claim 1, wherein the at least one layer of said soft static dissipative thermoplastic polyurethane in (b)(i) has a surface resistivity of from about 1.0×10$^6$ to about 1.0×10$^{10}$ ohms/square, and (ii) a Shore A durometer of from about 85 to about 95, and (iii) a gum residue in gasoline of less than about 10 milligrams.

7. The flexible multilayer composite of claim 6, wherein said soft static dissipative thermoplastic polyurethane is the reaction product of:
   i. at least one hydroxyl terminated intermediate selected from the group consisting of polyoxirane and poly (di-alkylene glycol ester),
   ii. at least one diisocyanate, and
   iii. at least one short chain dol.

8. The flexible multilayer composite of claim 7, wherein said polyoxirane hydroxyl terminated intermediate is selected from the group consisting of polyethylene glycol, polypropylene glycol, ethylene oxide-propylene oxide copolymer, and mixtures thereof.

9. The flexible multilayer composite of claim 8, wherein said polyethylene glycol has a number average molecular weight of from about 650 to about 3,000 Daltons.

10. The flexible multilayer composite of claim 9, wherein said polyethylene glycol has a number average molecular weight of about 1000 to about 2000, and said diisocyanate is 4,4'-methylenebis-(phenyl isocyanate)(MDI) and said short chain diol is 1,4-butanediol.

11. The flexible multilayer composite of claim 6, wherein said soft static dissipative thermoplastic polyurethane comprises an ionic additive.

12. The flexible multilayer composite of claim 11, wherein said ionic additive is a metal containing salt or ionic liquid and is present in an amount of from about 0.05 to about 5 weight percent of said soft static dissipative thermoplastic polyurethane.

13. The flexible multilayer composite of claim 1, wherein said flexible multilayer composite is a fuel bag for storing or transporting fuel, said fuel selected from the group consisting of gasoline having from 0 to 85 weight percent ethanol, diesel fuel, and fuel oil.

14. The flexible multilayer composite of claim 13, wherein said flexible multilayer composite fuel bag comprises:
   a) an inner layer configured to be in contact with said fuel, said inner layer being a soft static dissipative polyurethane as described in claim 1(b) and having a thickness of from about 0.005 to about 3.0 mm;
   b) an intermediate barrier layer of a high hardness thermoplastic polyurethane, as described in claim 1(a) and having a thickness of from about 0.005 to about 0.3 mm; and
   c) an outer layer of abrasion resistant thermoplastic polyurethane having a thickness of from about 0.005 to about 3.0 mm.

15. The flexible multilayer composite of claim 14, wherein said composite is a film and said layers (a) and (b) are melt bonded together and said layers (b) and (c) are melt bonded together.

16. The flexible multilayer composite of claim 15, wherein layer (c) contains a reinforcement material.

17. A process for producing a multilayer composite comprising melt processing:
   a) at least one layer of film of soft static dissipative thermoplastic polyurethane, wherein said soft static dissipative thermoplastic polyurethane has the following properties:
      i. a surface resistivity of less than about $1.0 \times 10^{12}$ ohms/square, as measured according to ASTM D-257;
      ii. a Shore durometer of from about 60 A to about 60 D, as measured according to ASTM D-2240; and
      iii. a gum residue after one week exposure in gasoline of less than about 20 milligrams per 100 milliliters of gasoline, as measured according to ASTM D-381; and
   b) at least one layer of vapor barrier film of high hardness thermoplastic polyurethane, wherein said high hardness thermoplastic polyurethane has the following properties:
      i. a Shore D durometer of at least about 80, as measured according to ASTM D-2240;
      ii. a soft segment content of less than about 5 weight percent;
      iii. a low gasoline vapor transmission rate of less than about 1 gram/meter$^2$/day, as measured according to ASTM D-814; and
   c) optionally, at least one layer of abrasion resistant thermoplastic polyurethane; wherein said layers (a) and (b) are melt bonded to each other, and if optional layer (c) is used, it is melt bonded to layer (b).

18. The process of claim 17, wherein said melt processing is selected from the group consisting of extrusion and calendering.

19. The process of claim 18, wherein said layer (a) has a thickness of from about 0.005 to about 3.0 mm, and layer (b) has a thickness of from about 0.005 to about 0.3 mm, and the optional layer (c) is present at a thickness of from about 0.005 to about 3 mm.

20. The process of claim 19, wherein said layer (a) is a polyether thermoplastic polyurethane having a Shore A durometer hardness of from about 85 to about 95, a surface resistivity of from about $1.0 \times 10^6$ to about $1.0 \times 10^{10}$ ohms/square, and a gum residue in gasoline of less than about 10 milligrams; and wherein said polyether thermoplastic polyurethane is the reaction product of:
   I. polyethylene glycol having a number average molecular weight of from about 650 to about 3,000 Daltons;
   II. 1,4-butanediol; and
   III. 4,4'-methylenebis-(phenyl isocyanate)(MDI);
wherein layer (b) is the reaction product of a diisocyanate and a short chain aliphatic diol.

21. The process of claim 20, wherein said polyether thermoplastic polyurethane in layer (a) comprises from about 0.05 to about 5 weight percent of at least one ionic additive.

22. The process of claim 21, wherein said ionic additive is a metal containing salt or ionic liquid.

23. A fuel storage vessel or a fuel transport vessel comprising fuel and an outside structural support and a fuel bag comprising a flexible multilayer composite located between said fuel and said structural support, said flexible multilayer composite comprising:
   a) at least one layer of soft static dissipative thermoplastic polyurethane configured to be in contact with said fuel, wherein said soft static dissipative thermoplastic polyurethane has the following properties:
      i. a surface resistivity of from about $1.0 \times 10^6$ to about $1.0 \times 10^{10}$ ohms/square, as measured according to ASTM D-257;
      ii. a Shore A durometer of from about 85 to about 95, as measured according to ASTM D-2240;
      iii. a gum residue after one week exposure in gasoline of less than about 20 milligrams per 100 milliliters of gasoline, as measured according to ASTM D-381; and
   b) at least one layer of high hardness vapor barrier thermoplastic polyurethane bonded to said layer (a), wherein said high hardness vapor barrier thermoplastic polyurethane has the following properties:
      i. a Shore D durometer of at least about 80, as measured according to ASTM D-2240;
      ii. a soft segment content of less than about 5 weight percent;

iii. a low gasoline vapor transmission rate of less than about 1 gram/meter$^2$/day, as measured according to ASTM D-814; and c) optionally, at least one layer of abrasion resistant thermoplastic polyurethane bonded to layer (b) and configured to be in at least partial contact with the inside surface of said structural support.

24. The vessel of claim 23, wherein said flexible multilayer composite comprises:

layer (a) at a thickness of from about 0.005 to about 3.0 mm, layer (b) at a thickness of from about 0.005 to about 0.3 mm, and optional layer (c) is present at a thickness of from about 0.005 to about 3.0 mm.

25. The vessel of claim 24 wherein layer (a) has a Shore A durometer of from about 85 to about 95, wherein layer (b) has a Shore D durometer of about 85, and wherein layer (c) has a Shore A durometer of from about 80 to about 98.

26. The vessel of claim 25, wherein layer (b) is the reaction product of a diisocyanate and an aliphatic short chain diol in the substantial absence of a soft segment generating hydroxyl terminated intermediate.

27. The vessel of claim 23, wherein said fuel bag is made from multiple multilayer composite sheets wherein each sheet is securely attached to an adjacent sheet.

28. The vessel of claim 27, wherein said adjacent sheet is securely attached by heat welding, high frequency welding, or by adhesive.

29. A fuel storage bag comprising a flexible multilayer composite, wherein said flexible multilayer composite comprising:

a) at least one layer of soft static dissipative thermoplastic polyurethane, wherein said soft static dissipative thermoplastic polyurethane has the following properties:

i. a surface resistivity of from about $1.0 \times 10^6$ to about $1.0 \times 10^{10}$ ohms/square, as measured according to ASTM D-257;

ii. a Shore A durometer of from about 85 to about 95, as measured according to ASTM D-2240;

iii. a gum residue after one week exposure in gasoline of less than about 20 milligrams per 100 milliliters of gasoline, as measured according to ASTM D-381; and b) at least one layer of high hardness vapor barrier thermoplastic polyurethane bonded to said layer a), wherein said high hardness vapor barrier thermoplastic polyurethane has the following properties:

i. a Shore D durometer of at least about 80, as measure according to ASTM D-2240;

ii. a soft segment content of less than about 5 weight percent;

iii. a low gasoline vapor transmission rate of less than about 1 gram/meter$^2$/day, as measured according to ASTM D-814; and c) at least one layer of abrasion resistant thermoplastic polyurethane bonded to layer b), and wherein said abrasion resistant thermoplastic polyurethane contains a reinforcement material.

30. The fuel storage bag of claim 29, wherein said reinforcement in said abrasion resistant thermoplastic polyurethane is a woven fabric.

31. The fuel storage bag of claim 30, wherein said woven fabric is made from fibers selected from the group consisting of polyamide, and aromatic polyamide.

32. The fuel storage bag of claim 31, wherein said woven fabric is a square woven fabric.

* * * * *